(12) United States Patent
Taniguchi et al.

(10) Patent No.: US 9,016,337 B2
(45) Date of Patent: Apr. 28, 2015

(54) PNEUMATIC TIRE

(75) Inventors: Jiro Taniguchi, Osaka (JP); Tetsuji Miyazaki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1131 days.

(21) Appl. No.: 13/011,974

(22) Filed: Jan. 24, 2011

(65) Prior Publication Data

US 2011/0226398 A1    Sep. 22, 2011

(30) Foreign Application Priority Data

Mar. 19, 2010    (JP) ................................. 2010-064655

(51) Int. Cl.
| | |
|---|---|
| B60C 11/13 | (2006.01) |
| B60C 11/03 | (2006.01) |
| B60C 11/04 | (2006.01) |

(52) U.S. Cl.
CPC ........... *B60C 11/0309* (2013.04); *B60C 11/045* (2013.01); *B60C 11/0306* (2013.04); *B60C 2011/0346* (2013.04); *B60C 2011/1338* (2013.04); *B60C 11/1315* (2013.04)

(58) Field of Classification Search
CPC ............ B60C 11/0306; B60C 11/0309; B60C 11/1315; B60C 11/1307; B60C 11/13; B60C 11/1323; B60C 2011/0346; B60C 2011/1338; B60C 11/1376; B60C 11/1384; B60C 11/1392; B60C 11/11; B60C 11/0339; B60C 11/0341; B60C 11/0346; B60C 11/0353; B60C 11/042; B60C 11/045

USPC .......... 152/209.21, DIG. 1, 900, 902, 209.18, 152/209.19, 209.24

See application file for complete search history.

(56) References Cited

U.S. PATENT DOCUMENTS

| | | | |
|---|---|---|---|
| 2001/0054465 A1 | 12/2001 | Tozawa et al. | |
| 2005/0092413 A1* | 5/2005 | Miyazaki | 152/209.24 |

FOREIGN PATENT DOCUMENTS

| | | | |
|---|---|---|---|
| DE | 1480927 | | 3/1969 |
| JP | 4-185508 | * | 7/1992 |
| JP | 08-244413 | | 9/1996 |
| JP | 2002002225 A | | 1/2002 |
| JP | 2009-006922 | | 1/2009 |
| WO | WO 2008/064703 | * | 6/2008 |

OTHER PUBLICATIONS

Office Action for Japanese Patent Application No. 2010-064655 dated Jun. 28, 2013 with English translation.

* cited by examiner

*Primary Examiner* — Eric Hug
(74) *Attorney, Agent, or Firm* — Fish & Richardson P.C.

(57) ABSTRACT

A pneumatic tire is provided with a main groove extending along a tire circumferential direction in a tread. A side wall of a land portion facing the main groove extends so as to be inclined with respect to a tire circumferential direction between a pair of corner portions. The corner portion positioned in an inner side in a width direction of the main groove is set to an inner corner portion and the corner portion positioned in an outer side is set to an outer corner portion. In the inner corner portion, the side wall is formed by a stepped surface expanding to the outer side in the width direction toward a groove bottom and an expansion to the outer side in the width direction in the stepped surface is made smaller from the inner corner portion toward the outer corner portion.

5 Claims, 4 Drawing Sheets

"Related Art"

"Related Art"

PNEUMATIC TIRE

BACKGROUND OF THE INVENTION

1. Field of the Invention

The present invention relates to a pneumatic tire which can achieve an excellent hydroplaning performance and an irregular wear resistance while suppressing a groove wander.

2. Description of the Related Art

As one of factors affecting a rectilinear propagation stability of a vehicle, there is a wandering phenomenon of a vehicle called a groove wander. The groove wander has been known to be generated by a lateral force at a time when a side wall of a land portion of a tread falls in a rain groove, and a reaction force at a time when the falling portion comes into collision with a groove wall of the rain groove. The rain groove is a groove which is provided so as to be extended in a forward moving direction and has a fixed width for the purpose of securing a traveling stability at a time of raining, and is formed on Kyushu Jukan Expressway, freeway in California, U.S.A. and the like.

Conventionally, in order to prevent the groove wander, there is devised a countermeasure for making the side wall of the land portion hard to fall in the rain groove, by employing a pattern design in which the side wall of the land portion facing a main groove is inclined with respect to a tire circumferential direction. However, in the main groove with the pattern design mentioned above, since a see-through region is reduced and a draining efficiency tends to be lowered, in comparison with the main groove extending linearly in the tire circumferential direction, there has been a room for improving the hydroplaning performance. The see-through region means a region within the main groove which can be seen through without being obstructed the view by the right and left side walls, when viewed the main groove in the tire circumferential direction.

In a tire described in Japanese Unexamined Patent Publication No. 2002-2225, a groove wall close to a shoulder is inclined larger in a bent portion close to the shoulder than a groove wall close to a center, with respect to a main groove extending in a tire circumferential direction and having a zigzag shape, and a groove wall close to a center is inclined larger in a bent portion close to the center than a groove wall close to a shoulder. In this structure, since a see-through region is reduced due to the incline of the groove wall as mentioned above, a hydroplaning performance tends to be lowered. Further, even if the groove wall is inclined inversely, a rigidity of the bent portion is lowered and there is fear that an irregular wear is generated.

SUMMARY OF THE INVENTION

The present invention has been made in view of the above circumstances, and an object of the present invention is to provide a pneumatic tire which can achieve an excellent hydroplaning performance and an irregular wear resistance while suppressing a groove wander.

The object can be achieved by the present invention having the following structure. That is, the present invention provides a pneumatic tire comprising a main groove extending along a tire circumferential direction in a tread, wherein a side wall of a land portion facing the main groove extends so as to be inclined with respect to a tire circumferential direction between a pair of corner portions, and in the case that out of the pair of corner portions, the corner portion positioned in an inner side in a width direction of the main groove is set to an inner corner portion and the corner portion positioned in an outer side in the width direction of the main groove is set to an outer corner portion, in the inner corner portion, the side wall is formed by a stepped surface expanding to the outer side in the width direction of the main groove toward a groove bottom and an expansion to the outer side in the width direction in the stepped surface is made smaller from the inner corner portion toward the outer corner portion.

In this pneumatic tire, since the side wall of the land portion facing the main groove extends while being inclined with respect to the tire circumferential direction, it is possible to suppress the groove wander. Further, since the side wall of the land portion is expanded to the outer side in a width direction of the main groove toward the groove bottom, in the inner corner portion positioned in the inner side in the width direction of the main groove, it is possible to improve the hydroplaning performance by increasing the see-through region. Further, since the side wall is formed by the stepped surface in the inner corner portion, and the expansion to the outer side in the width direction in the stepped surface becomes small toward the outer corner portion from the inner corner portion, it is possible to suppress the rigidity reduction in the inner corner portion so as to improve the irregular wear resistance.

In the present invention, it is preferable that the stepped surface is constructed by a plurality of inclined surfaces which are inclined to the inner side in the width direction of the main groove toward the groove bottom, and a coupling surface coupling the inclined surfaces to each other. In this case, since the portion extending in the tire diametrical direction of the side wall is constructed by the inclined surface which is inclined to the inner side in the width direction of the main groove toward the groove bottom, it is possible to effectively suppress the rigidity reduction in the inner corner portion so as to well improve the irregular wear resistance.

As an embodiment according to the present invention, there can be listed up a structure in which the land portion is constructed by blocks which are defined in the tire circumferential direction by the lateral groove, the inner corner portion is an obtuse angle portion of the block, and the outer corner portion is an acute angle portion of the block. The rigidity difference tends to be generated between the obtuse angle portion and the acute angle portion of the block, and there is fear that a heel and toe wear is generated by the rigidity difference. However, according to the present invention, since it is possible to reduce the rigidity difference mentioned above, it is possible to preferably suppress the heel and toe wear.

In the above method, it is preferable that the expansion to the outer side in the width direction in the stepped surface is focused in the outer corner portion, and the side wall is formed so as to be inclined to the inner side in the width direction of the main groove toward the groove bottom. With the structure mentioned above, it is possible to enhance the rigidity in the outer corner portion corresponding to the acute angle portion of the block so as to effectively suppress the heel and toe wear.

As an embodiment according to the present invention, there can be listed up a structure in which the land portion is constructed by a rib having a zigzag-shaped side wall continuously extending in the tire circumferential direction, the inner corner portion is a convex bent portion of the rib, and the outer corner portion is a concave bent portion of the rib. In the rig having the zigzag-shaped side wall, it is possible to effectively suppress the groove wander, however, it is hard to secure the see-through region and the draining efficiency tends to be lowered. However, according to the present invention, it is possible to improve the hydroplaning performance by expanding the see-through region at the convex bent portion of the rib, while suppressing the groove wander.

DETAILED DESCRIPTION OF THE PREFERRED EMBODIMENTS

Figure 1:
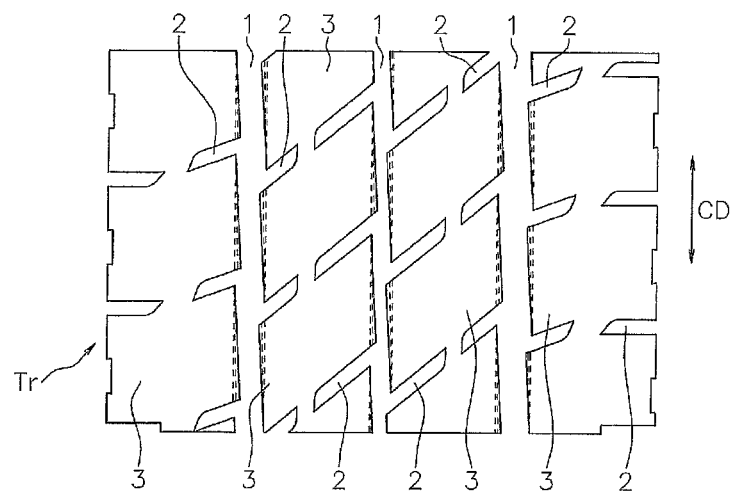
FIG. 1 is a plan view showing an example of a tread of the pneumatic tire of the present invention.

An embodiment of the present invention will be explained with reference to the drawings. In a tread Tr shown in FIG. 1, there are formed a plurality of main grooves 1 extending along a tire circumferential direction CD, and lateral grooves 2 extending in a direction intersecting the main groove 1. In the present embodiment, there is shown an example in which a land portion of the tread Tr is constructed by blocks 3 which are defined in a tire circumferential direction by the lateral grooves 2. The lateral groove 2 is formed into a notch shape in such a manner as not to completely segment the blocks 3, however, is not limited to this, but the lateral grooves 2 may communicate the main grooves 1 with each other.

Figure 2:
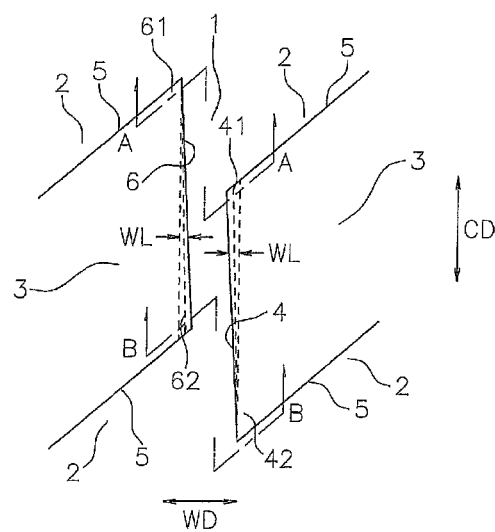
FIG. 2 is a plan view showing a substantial part of the tread thereof.

As shown in an enlarged manner in FIG. 2, a side wall 4 of the block 3 facing the main groove 1 extends so as to be inclined to the tire circumferential direction CD between a pair of corner portions 41 and 42 which are positioned apart in the tire circumferential direction CD, and the inclined side wall 4 is intermittently arranged along the tire circumferential direction CD. Further, a side wall 6 opposed thereto extends so as to be inclined to the tire circumferential direction CD between a pair of corner portions 61 and 62. With the incline of the side walls 4 and 6, it is possible to reduce a falling in the rain groove so as to suppress the groove wander. In order to secure a suppressing effect mentioned above, it is preferable that an angle of incline on a tread surface of the side walls 4 and 6 is equal to or more than 0.5° with respect to the tire circumferential direction CD. An upper limit value is not particularly limited, however, the angle of incline may be set to such a degree that can secure a see-through region, for example, such a degree that a width of the region becomes equal to or more than 1 to 2 mm, and is preferably within a range between 0.5 and 10°.

The corner portions 41 and 42 are the corner portions that are formed by the side wall 4 facing the main groove 1 and the side wall 5 facing the lateral groove 2. In FIG. 2, the side wall 4 is inclined right downward with respect to the tire circumferential direction CD, the corner portion 41 is positioned close to an inner side in a width direction WD of the main groove 1, and the corner portion 42 is positioned close to an outer side in the width direction WD of the main groove 1. Further, the corner portions 61 and 62 are the corner portions that are formed by the side wall 6 facing the main groove 1 and the side wall 5 facing the lateral groove 2, the corner portion 61 is positioned close to an outer side in the width direction WD of the main groove 1, and the corner portion 62 is positioned close to an inner side in the width direction WD of the main groove 1. Hereinafter, these corner portions are called the inner corner portion 41, the outer corner portion 42, the inner corner portion 62 and the outer corner portion 61.

As shown in FIGS. 2 to 5, in the inner corner portion 41, the side wall 4 is formed by a stepped surface expanding to an outer side in the width direction WD of the main groove 1 toward a groove bottom 10, and an expansion to the outer side in the width direction WD in the stepped surface is made smaller from the inner corner portion 41 toward the outer corner portion 42. An amount of widening WL is a width of a portion expanding to the outer side in the width direction WD, and is measured as a length running into a maximum position to the outer side in the width direction WD of the stepped surface from an edge of the tread surface of the block 3. As shown in FIG. 2, the amount of widening WL becomes smaller from the inner corner portion 41 toward the outer corner portion 42.

It is possible to increase the see-through region so as to improve the hydroplaning performance by expanding the side wall 4 to the outer side in the width direction WD in the inner corner portion 41 entering into the inner side of the main groove 1 as mentioned above. Further, since the side wall 4 is formed by the stepped surface, and the expansion to the outer side in the width direction is made smaller toward the outer corner portion 42, it is possible to suppress a rigidity reduction in the inner corner portion 41 so as to improve an irregular wear resistance. Accordingly, it is possible to achieve an excellent hydroplaning performance and an irregular wear resistance while suppressing a groove wander.

Figure 4:
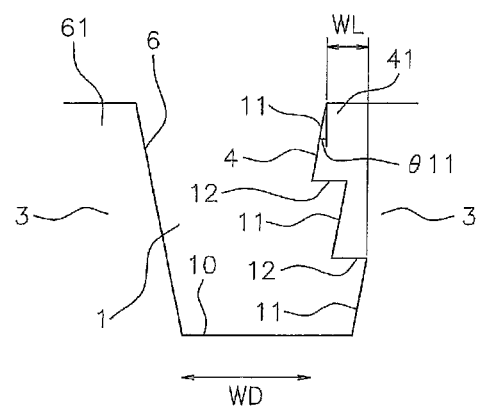
FIG. 4 is a cross sectional view as seen from an arrow A-A in FIG. 2.

Further, since the side wall 4 is formed by the stepped surface so as to be widened step by step, it is possible to well secure a rigidity of the inner corner portion 41 while avoiding a rapid rigidity change in a groove depth direction in the inner corner portion 41. In the present embodiment, as shown in FIG. 4, the stepped surface is constructed by a plurality of inclined surfaces 11 which are inclined to the inner side in the width direction WD toward the groove bottom 10, and a coupling surface 12 coupling the inclined surfaces 11 to each other. Since a portion extending in a tire diametrical direction of the side wall 4 is inclined as mentioned above, it is possible to effectively suppress the rigidity reduction in the inner corner portion 41. It is preferable that the stepped surface has three or more inclined surfaces 11 in order to absorb a rigidity change in the inner corner portion 41.

An angle of incline θ11 of the inclined surface 11 with respect to the tire diametrical direction goes beyond 0° in the light of suppression of the rigidity reduction in the inner corner portion 41, and is preferably between 2 and 15°. However, in the present invention, the angle θ11 may be 0°. In the example in FIG. 4, the coupling surface 12 extends in the width direction WD of the main groove 1, and is effective for efficiently expanding the see-through region. In addition, it is possible to employ such a shape that an outer end in the width direction WD of the coupling surface 12 is connected to the inclined surface 11 via a curved surface, or such a shape that the coupling surface 12 is inclined to the groove bottom side toward the outer side in the width direction WD, and they are effective for suppressing the rigidity reduction in the inner corner portion 41.

The side wall 6 is formed in the same manner as the side wall 4. As shown in FIGS. 2 to 5, in the inner corner portion 62, the side wall 6 is formed by the stepped surface which expands to the outer side in the width direction WD of the main groove 1 toward the groove bottom 10, and the expansion to the outer side in the width direction WD in the stepped surface is made smaller from the inner corner portion 62 toward the outer corner portion 61. In the structure mentioned above, the side walls 4 and 6 constructing the left and right groove walls of the main groove 1 expand the corner portions respectively entering into the main groove 1 to the outer side in the width direction WD, and it is possible to efficiently increase the see-through region in the main groove 1.

In the present embodiment, the land portion of the tread Tr is constructed by the blocks 3, the inner corner portion 41 comes to an obtuse angle portion of the block 3, and the outer corner portion 42 comes to an acute angle portion of the block 3. In this case, there is fear that a heel and toe wear is generated by a rigidity difference between the obtuse angle portion and the acute angle portion, however, since the expansion to the outer side in the width direction WD in the stepped surface forming the side wall 4 is changed as mentioned above, it is possible to reduce the rigidity difference so as to preferably suppress the heel and toe wear.

Figure 5:
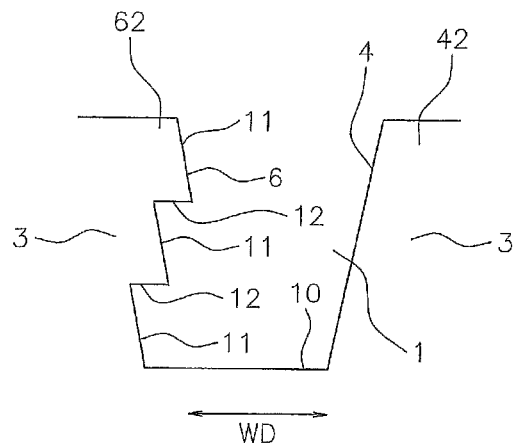
FIG. 5 is a cross sectional view as seen from an arrow B-B in FIG. 2.

As shown in FIGS. 2 and 5, in the outer corner portion 42, the expansion to the outer side in the width direction in the stepped surface is focused, and the side wall 4 is formed so as to be inclined to the inner side in the width direction WD toward the groove bottom 10. In other words, in a ridge line formed by the side wall 4 and the side wall 5 in the outer corner portion 42, the amount of widening WL is substantially zero. Accordingly, it is possible to enhance the rigidity in the outer corner portion 42 serving as the acute angle portion of the block 3 so as to effectively suppress the heel and toe wear.

The lateral groove 2 may be structured to have the conventional V-shaped groove cross section (see FIG. 7), however, may be formed by the stepped surface such as the side wall 4 mentioned above. In the case that the lateral groove 2 is formed by the stepped surface as mentioned above, a draining performance is improved by securing the width of the groove bottom, and the irregular wear is suppressed by setting the stepped surface in the obtuse angle portion of the block 3.

Figure 6:
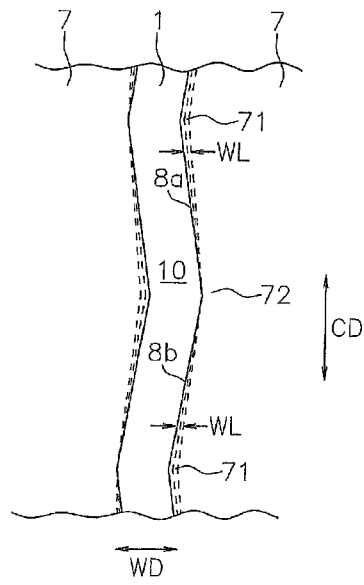
FIG. 6 is a plan view showing a substantial part of a tread according to another embodiment of the present invention.

In the present invention, the land portion of the tread may be constructed by a rib 7 having a zigzag-shaped side wall which continuously extends in the tire circumferential direction CD as shown in FIG. 6. A description will be given below of the side wall of the rib 7, however, an overlapping description will be omitted with regard to a point which is in common with the side wall of the block 3 mentioned above. The side wall of the rib 7 is constructed by side walls 8a and 8b extending so as to be inclined with respect to the tire circumferential direction CD between a pair of corner portions 71 and 72. The inclined side walls 8a and 8b are inclined inversely to each other, and are continuously arranged so as to be side by side alternately along the tire circumferential direction CD. The side wall opposed thereto is constructed in the same manner.

In a pair of corner portions 71 and 72, the corner portion 71 comes to an inner corner portion which is positioned in the inner side in the width direction WD of the main groove 1, and the corner portion 72 comes to an outer corner portion which is positioned in the outer side in the width direction WD of the main groove 1. In the inner corner portion 71, the side walls 8a and 8b are formed by the stepped surface expanding to the outer side in the width direction WD of the main groove 1 toward the groove bottom 10, and the expansion to the outer side in the width direction WD in the stepped surface is made smaller from the inner corner portion 71 toward the outer corner portion 72. A shape at a time of obliquely viewing the side wall 8a can refer to FIG. 3.

In the present embodiment, the inner corner portion 71 comes to a convex bent portion of the rib 7, and the outer corner portion 72 comes to a concave bent portion of the rib 7. In the rib 7 having the zigzag-shaped side wall, it is possible to effectively suppress the groove wander, however, it is hard to secure the see-through region and the draining efficiency tends to be lowered. However, according to the present invention, it is possible to expand the see-through region at the inner corner portion 71 serving as the convex bent portion of the rib 7 while suppressing the groove wander, and it is possible to improve the hydroplaning performance.

EXAMPLE

An example tire which concretely shows the structure and effect of the present invention will be explained. An evaluation of each of performances is executed as follows.

(1) Groove Wander Performance

A tire was installed to a vehicle (6600 cc, 4WD diesel truck), a pneumatic pressure was set to 420 kPa, and a feeling evaluation was executed by traveling on a rain groove simulation road. The evaluation is shown by an index number in the case of setting a result of a comparative example 1 to 100, and indicates that the larger the numerical value is, the more the groove wander can be suppressed.

(2) Hydroplaning Performance

The tire was installed to the vehicle mentioned above, the pneumatic pressure was set to 420 kPa, and a speed at which the hydroplaning phenomenon was generated at a water depth 8 mm was measured. The evaluation is shown by an index number in the case of setting a result of the comparative example 1 to 100, and indicates that the larger the numeral value is, the higher the speed is, and the hydroplaning performance is excellent.

(3) Irregular Wear Resistance (Heel and Toe Wear Performance)

The tire was installed to the vehicle mentioned above, the pneumatic pressure was set to 420 kPa, and a wear step amount in the corner portion of the block (between the lateral grooves) was measured after traveling for 12000 km on a general road. It indicates that the smaller the numeral value is, the more the heel and toe wear can be suppressed.

Figure 3:
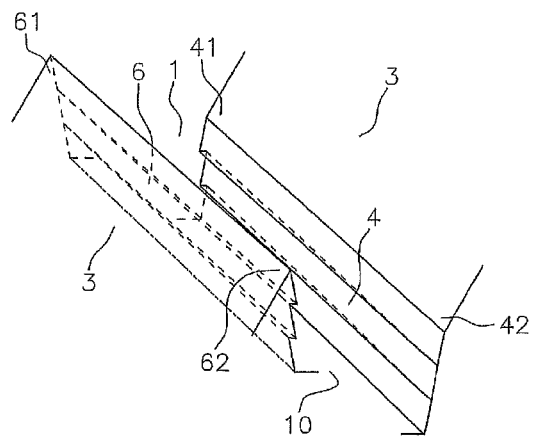
FIG. 3 is a perspective view showing a side wall of a block.
Figure 7:
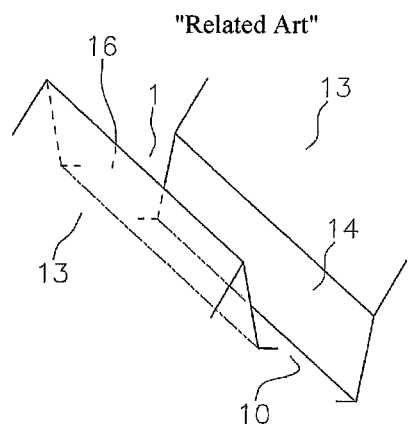
FIG. 7 is a perspective view showing a side wall of a block in a comparative example 1.
Figure 8:
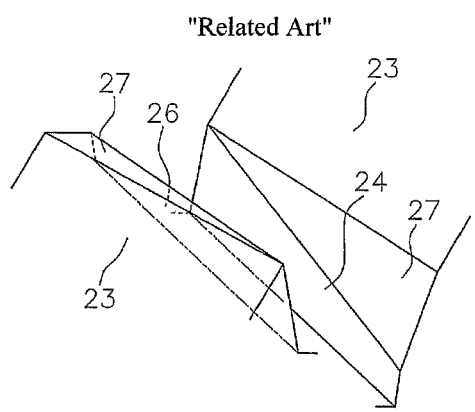
FIG. 8 is a perspective view showing a side wall of a block in a comparative example 2.

In the pneumatic tire having the tread pattern shown in FIG. 1 (size: LT265/75R16), the side wall of each of the blocks was formed as shown in FIG. 7 in the comparative example 1, was formed as shown in FIG. 8 in a comparative example 2, and was formed as shown in FIG. 3 in an example. The side walls 14 and 16 of the block 13 shown in FIG. 7 are formed by a flat surface which is inclined to the inner side in the width direction toward the groove bottom 10, and the main groove 1 has the conventional V-shaped groove cross section. In side walls 24 and 26 of a block 23 shown in FIG. 8, a chamfer 27 is formed largely in the outer corner portion.

TABLE 1

|  | Comparative example 1 | Comparative example 2 | Example |
|---|---|---|---|
| Groove wander performance | 100 | 100 | 100 |
| Hydroplaning performance | 100 | 100 | 105 |
| Heel and toe wear performance (mm) | 1.2 to 1.5 | 0.9 to 1.2 | 0.9 to 1.2 |

From the result of evaluation shown in Table 1, it is known that in the example, the hydroplaning performance and the heel and toe wear performance can be improved while the groove wander performance is equivalent, in comparison with the comparative examples 1 and 2.

What is claimed is:

1. A pneumatic tire comprising:
a main groove extending along a tire circumferential direction in a tread,
wherein a side wall of a land portion facing the main groove extends so as to be inclined with respect to a tire circumferential direction between a pair of corner portions, and of the pair of corner portions, the corner portion positioned in an inner side in a width direction of the main groove is set to an inner corner portion and the corner portion positioned in an outer side in the width direction of the main groove is set to an outer corner portion, and in the inner corner portion, the side wall is formed by a stepped surface having an expansion toward the outer side at each step in the width direction of the main groove and extending toward a groove bottom, and an amount of widening (WL) of an expansion to the outer side in the width direction in the stepped surface becomes progressively smaller in a direction from the inner corner portion toward the outer corner portion, and
wherein the stepped surface is constructed by a plurality of inclined surfaces which are inclined to the inner side in the width direction of the main groove toward the groove bottom, and there is a coupling surface coupling the inclined surfaces to each other.

2. The pneumatic tire according to claim 1, wherein the land portion is constructed by a rib having a zigzag-shaped side wall continuously extending in the tire circumferential direction, the inner corner portion is a convex bent portion of the rib, and the outer corner portion is a concave bent portion of the rib.

3. The pneumatic tire according to claim 1, wherein in the depth direction of the main groove, the side wall is angled toward an opposing side wall in a groove depth direction so as to decrease the width of the main groove until the coupling surface between a pair of adjacent inclined surfaces on the side wall is reached and, at the coupling surface, the width of the main groove increases and then begins decreasing again in the depth direction along the adjacent inclined surface until a second coupling surface is reached, and the width of the main groove increases again.

4. A pneumatic tire comprising:
a main groove extending along a tire circumferential direction in a tread,
wherein a side wall of a land portion facing the main groove extends so as to be inclined with respect to a tire circumferential direction between a pair of corner portions, and of the pair of corner portions, the corner portion positioned in an inner side in a width direction of the main groove is set to an inner corner portion and the corner portion positioned in an outer side in the width direction of the main groove is set to an outer corner portion, and in the inner corner portion, the side wall is formed by a stepped surface having an expansion toward the outer side at each step in the width direction of the main groove and extending toward a groove bottom, and an amount of widening (WL) of an expansion to the outer side in the width direction in the stepped surface becomes progressively smaller in a direction from the inner corner portion toward the outer corner portion, and
wherein the land portion is constructed by blocks which are defined in the tire circumferential direction by a lateral groove, the inner corner portion is an obtuse angle portion of the block, and the outer corner portion is an acute angle portion of the block.

5. The pneumatic tire according to claim 4, wherein the expansion to the outer side in the width direction in the stepped surface is focused in the outer corner portion, and the side wall is formed so as to be inclined to the inner side in the width direction of the main groove toward the groove bottom.

* * * * *